United States Patent Office 3,356,731
Patented Dec. 5, 1967

3,356,731
METHOD FOR PRODUCING 2-ACETYL-1,3-DIKETONE
John Martin Nilsson, Framnasbacken 14, Solna, Sweden, and Ferenc Merényi, Sveavagen 166 D 24, Stockholm, Sweden
No Drawing. Filed May 11, 1964, Ser. No. 366,634
Claims priority, application Sweden, May 14, 1963, 5,285/63
15 Claims. (Cl. 260—586)

The present invention relates to a method of producing 2-acetyl-1,3 diketones.

It has been previously suggested, e.g. in German patent specification No. 859,145 and in the periodical, "Chemische Berichte," 84 of 1951, page 607, to produce symmetrical 1,3-diketones by reacting chlorides of monocarboxylic acids with vinyl acetate. Trials to use the corresponding procedure for the producing of indane-1,3-dione from phthalylchloride and vinyl acetate have led to the formation of small quantities of 2-acetylindane-1,3-dione and when reacting succinyl chloride with vinyl acetate one was not successful in obtaining the intended cyclopentanedione but instead of this there were formed very small quantities of the order 0.2% of 2-acetyl-cyclopentane-1,3-dione.

The main object of the present invention is to find a general method for the production or the synthesis of 2-acetyl-1,3-diketones in good or reasonable yields. This object now can be achieved by utilization of a special substituted vinyl ester, viz. isopropenyl acetate, which has proved to be easily acylated with carboxylic acid halogenides as well as anhydrides in the presence of Lewis acid catalysts of the group consisting of aluminum chloride and titanium tetrachloride. The acylation reaction is just as easily performed with dicarboxylic acid anhydrides or halides as with the corresponding monocarboxylic derivatives provided that the dicarboxylic acids can be cyclisized.

In preferred embodiments of this invention, the dicarboxylic acid anhydride or halide will have between 2 and 4 carbon atoms between the carboxylic groups. This will result in cyclic 2-acetyl-1,3-diketones having between 5 and 7 carbon atoms in the ring in which the isopropenyl acetate is acylated.

The reaction conditions, aside from the use of the novel reactants in the presence of the Lewis acid catalyst are conventional. Thus, the reaction is conveniently carried out by combining the reactants at about room temperature, under which conditions the reactant mass is liquid. It may be desirable also to employ a solvent, such as dichloromethane, 1,1,2,2 tetrachloroethane, 1,2 dichloroethane, etc. In many instances the reaction is sufficiently vigorous and exothermic to heat the liquid phase reaction mass to its boiling point. Other combinations of reactants yield a less vigorous reaction. In this case, it may be desirable to heat the reaction mass to as high as its boiling point. If the reaction mass is boiling either because of the heat liberated by the reaction or because it is heated, it should be refluxed to prevent the escape of reactants and/or solvents.

Typical reactants which may be used in the practice of this invention include, but are not limited to, acetic anhydride, succinic anhydride, succinic chloride, α,α dimethyl succinic anhydride, maleic anhydride, alkyl substituted maleic anhydride, halogen substituted maleic anhydride, the polymeric anhydride of adipic acid, and adipyl halides.

The reaction of the isopropenyl acetate with anhydrides or halogenides of monocarboxylic acids results in acyclic 2-acetyl-1,3-diketones whereas the use of anhydrides or halogenides of dicarboxylic acids such as succinic acid, glutaric acid, maeic acid and phthalic acid gives cyclic 2-acetyl-1,3-diketones.

The possibilty according to the invention to use anhydrides of acids instead of halogenides is particularly advantageous since very often the anhydrides are more readily accessible than the halogenides and further when using the anhydrides no free acetyl chloride can be formed. However, the reaction, as a rule, can also be carried out with carboxylic acid halides when such are available.

The 2-acetyl-1,3-diketones prepared by this method are important intermediates. Hydrolysis gives 1,3-diketones, of which the cyclic ones hitherto have been particularly inaccessible. The 2-acetylcyclopentone-1,3-diones are easily hydrogenated to 2-ethyl-cyclopentan-1,3-diones which are important intermediates in the steroid synthesis. Several compounds of the group of 2-acetyl-1,3-diketones show insecticidal or other biological activity.

The following examples illustrate the invention.

EXAMPLE 1

2-acetylcyclopentane-1,3-dione 10 g. isopropenyl acetate is added under stirring to a mixture of 10 g. succinic anhydride and 27 g. anhydrous aluminium chloride in 100 ml. 1,2-dichloroethane. The mixture becomes hot and is refluxed for some minutes after completed addition. The mixture is poured into a mixture of 250 g. ice and dilute (2 M) hydrochloric acid. The organic phase is separated and the aqueous phase is extracted continuously with chloroform overnight. The combined organic phases are dried over sodium sulphate and evaporated. The residue is a mixture of acetylcyclopentanedione, smaller amounts of cyclopentane-1,3-dione and succinic acid. From this mixture 2-acetylcyclopentane-1,3-dione is isolated by sublimation (60° C., 0.1 mm. Hg) or by extraction with boiling light petroleum boiling point (B.P.) 40–60° C. It is obtained as needles with the melting point (M.P.) 73–74° C. in a yield of 7 g. (50%).

Analysis.—Calculated for $C_7H_8O_3$: C=60.0%; H=5.8%. Found: C=59.5%; H=5.9%.

The reaction can be run with somewhat lower yield in dichloromethane or with good result in 1,1,2,2-tetrachloroethane at ca. 80° C. (yield 65%).

Certain other acidic reagents can be used for the reaction. If the aluminum chloride is substituted by an equivalent amount of titanium tetrachloride 2-acetylcyclopentane-1,3-dione is obtained in 10% yield.

EXAMPLE 2

2-acetylcyclopentane-1,3-dione 10 g. isopropenyl acetate is added under stirring at 0° C. to a mixture of succinyl chloride (15.5 g.) and anhydrous aluminum chloride (27 g.) in 1,2-dichloroethane (100 ml.). After completed addition the temperature is raised to 50° C. and kept at this temperature for 12 hours. The mixture is worked up as in Example 1 and gives 6.3 g. acetylcyclopentanedione (45%).

EXAMPLE 3

2-acetylcyclohexane-1,3-dione

Isopropenyl acetate (10 g.) is added under stirring to a mixture of glutaric anhydride (11.4 g.) and anhydrous aluminum chloride (27 g.) in 1,2-dichloroethane (or dichloromethane). When the exothermic reaction has subsided the reaction mixture is poured into ice and hydrochloric acid. The organic phase is separated and the aqueous phase is extracted with chloroform. The organic phases are combined and dried, the solvent is evaporated and the residue is distilled to give 2-acetylcyclo-hexane-1, 3-dione (B.P. ca. 60° C. at 0.1 mm. Hg, M.P. 29–31° C.) in a yield of 6.2 g. (40%). From the distillation residue 10–20% of cyclohexane-1,3-dione can be obtained by extraction with boiling ethyl acetate.

EXAMPLE 4

2-acetyl-4-methylcyclopent-4-ene-1,3-dione

Isopropenyl acetate (10 g.) is added under stirring to a mixture of citraconic anhydride (11.2 g.) and anhydrous aluminium chloride (27 g.) in 1,2-dichloroethane. The mixture starts to boil. It is refluxed for 2 hours and is allowed to cool. The mixture is poured into ice and hydrochloric acid. The organic phase is separated and the aqueous phase is extracted with chloroform. The combined organic phases are dried, the solvent evaporated and the residue is distilled. The distillate is treated with a solution of copper(II)acetate till complete precipitation of the green copper salt, which is filtered off and washed with methanol. The copper salt is decomposed with dilute sulphuric acid and ether. The ether solution is evaporated and gives 2-acetyl-4-methylcyclopent-4-ene-1,3-dione in a yield of 1.8 g. (12%). The product is recrystallized from light petroleum (M.P. 45–50° C. unsharp due to the presence of two almost equivalent tautomeric forms).

*Analysis.*—Calculated for $C_8H_8O_3$: C=63.2%; H=5.3%. Found: C=63.2%; H=5.4%.

EXAMPLE 5

2-acetylindane-1,3-dione

Isopropenyl acetate (10 g.) is added under stirring to a mixture of phthalic anhydride (14.8 g.) and anhydrous aluminium chloride (27 g.) in 1,1,2,2-tetrachloroethane (100 ml.). The mixture is kept at 80° C. for 2 hours. After decomposition with ice and hydrochloric acid the organic phase is separated and the aqueous phase is extracted with chloroform. The combined organic phases are steam distilled and the solvents and the 2-acetylindane-1,3-dione distill with the steam. From the distillate 2-acetylindane-1,3-dione is isolated in a yield of 4 g. (2.5%), M.P. 111–113° C.

EXAMPLE 6

Triacetylmethane

Isopropenyl acetate (10 g.) is added under stirring to a mixture of acetic anhydride (10.2 g.) and anhydrous aluminium chloride (27 g.) in 1,2-dichloroethane (100 ml.). The mixture is refluxed for 30 min. is allowed to cool and is then poured into a mixture of ice and dilute hydrochloric acid. The organic phase is separated and the aqueous phase is extracted continuously with chloroform. The combined organic phases are extracted with saturated sodium hydrogen carbonate solution. The extract is acidified and extracted with chloroform. The extract is dried with sodium sulphate, the solvent is evaporated and the residue is distilled to give triacetylmethane, B.P. 100° C. at 20 mm. Hg, in 10% yield.

EXAMPLE 7

2-acetylcycloheptane-1,3-dione

Isopropenyl acetate is added under stirring to a mixture of polymeric anhydride of adipic acid (12.8 g.) and anhydrous aluminium chloride (27 g.) in 1,2-dichloroethane (100 ml.). When the exothermic reaction has subsided and the mixture cooled the mixture is poured into a mixture of ice and dilute hydrochloric acid. The organic phase is separated and is then extracted with ether. The ether solution is dried and evaporated and the residue distilled to give 2-acetylcycloheptane-1,3-dione in 12% yield (B.P. 76° C. at 0.3 mm., M.P. 27–28° C.).

*Analysis.*—Calculated for $C_9H_{12}O_3$: C=64.3%; H=7.2%. Found: C=64.4%; H=7.2%.

2-acetylcycloheptane-1,3-dione is obtained in ca. 18% yield when an equivalent amount of adipoyl chloride is used instead of the polymeric anhydride of adipic acid.

EXAMPLE 8

2-acetyl-4-methylcyclopentane-1,3-dione

Isopropenyl acetate (10 g.) is added under stirring to a mixture of methylsuccinic anhydride (11.4 g.) and anhydrous aluminium chloride (27 g.) in 1,2-dichloroethane (100 ml.). The mixture is refluxed for 30 min. and after cooling poured into a mixture of ice and dilute hydrochloric acid. The organic phase is separated and the aqueous phase extracted with chloroform. The combined organic phases are extracted with saturated sodium hydrogen carbonate solution. This is acidified and extracted with ether. After drying and evaporation of the solvent 2-acetyl-4-methylcyclopentane-1,3-dione is isolated by distillation, B.P. 52° C. at 0.1 mm., M.P. ca. 18–19° C.

*Analysis.*—Calculated for $C_8H_{10}O_3$: C=62.3%; H=6.5%. Found: C=62.5%; H=6.6%.

EXAMPLE 9

2-acetyl-4,4-dimethylcyclopentane-1,3-dione

Is prepared according to Example 8 with the methylsuccinic anhydride substituted by $\alpha,\alpha$ - dimethylsuccinic anhydride (12.8 g.). The 2 - acetyl - 4,4 - dimethylcyclopentane-1,3-dione is obtained as an oil, B.P. 52° C. at 0.4 mm. in 10% yield.

*Analysis.*—Calculated for $C_9H_{12}O_3$: C=64.3%;

$$H=7.2\%$$

Found: C=64.2%; H=7.3%.

EXAMPLE 10

2-acetylcyclopent-4-ene-1,3-dione

Isopropenyl acetate (10 g.) is added under stirring to a mixture of maleic anhydride (9.8 g.) and anhydrous aluminum chloride (27 g.) in 1,1,2,2,-tetrachloroethane (100 ml.) during 10 min. When the exothermic reaction has subsided and the solution cooled the mixture is poured into ice and hydrochloric acid. The organic phase is separated and the aqueous phase is extracted with chloroform. The combined organic phases are extracted with dilute sodium hydroxide solution, this solution is acidified and extracted with ether. The ether solution is dried and evaporated, the residue is sublimed at 100° C. at 20 mm. The sublimate is dissolved in methanol and a saturated solution of copper (II) acetate in water is added. The green copper salt is collected and washed with methanol and is then shaken with dilute sulphuric acid and ether. The ether solution is evaporated leaving 2 - acetylcyclopent-4-ene-1,3-dione in 5% yield, M.P. 83–84° C.

*Analysis.*—Caluclated for $C_7H_6O_3$: C=60.9%;

$$H=4.4\%$$

Found: C=60.9%; H=4.9%.

EXAMPLE 11

2-acetyl-4-chlorocyclopent-4-ene-1,3-dione

Is prepared according to Example 4 with the citraconic anhydride substituted by chloromaleic anhydride (13.2 g). The 2-acetyl-4-chlorocyclopent-4-ene-1,3-dione obtained is recrystallized from light petroleum to give a mixture of two crystalline forms with the melting points 75–80° C. and 85–87° C.

*Analysis.*—Calculated for $C_7H_5Cl_5O_3$: C=48.7%;

$$H=2.9\%; Cl=20.5\%$$

Found: C=48.9%; H=3.0%; Cl=20.9%.

EXAMPLE 12

2-acetyl-4,5-dimethylcyclopent-4-ene-1,3-dione

Isopropenyl acetate is added under stirring to a mixture of dimethylmaleic anhydride (12.6 g.) and anhydrous aluminum chloride (27 g.) in 1,1,2,2,-tetrachloroethane (100 ml.). The mixture is refluxed for 3 hours and after cooling poured into ice and dilute hydrochloric acid. The mixture is filtered through celite. The organic phase is separated and extracted with sodium hydroxide solution. The extract is acidified and extracted with ether. The ether solution is dried and evaporated and the residue sublimed at 100° C. at 20 mm. The sublimate is treated with copper(II)acetate solution (see Examples 4 and 10). After decomposition of the copper salt 2-acetyl-4,5-dimethylcyclopent-4-ene-1,3-dione is obtained in 11% yield, M.P. 51–52° C.

*Analysis.*—Calculated for $C_9H_{19}O_3$: $C=65.1\%$;

$$H=6.1\%$$

Found: $C=65.0\%$; $H=6.0\%$.

In all examples the molar relation between isopropenyl acetate, carboxylic acid anhydride and $AlCl_3$ is about 1:1:2.

The structures of the compounds described in the examples have been confirmed by spectroscopic investigations.

The compounds produced according to Examples 4, 7, 8, 9, 10, 11 and 12 are novel per se and have not been synthetized before our invention.

What is claimed is:

1. A method of producing 2 - acetyl - 1,3 - diketones, which comprises reacting isopropenyl acetate with a carboxylic acid derivative selected from the group consisting of the halides and anhydrides of phthalic acid, and of aliphatic mono and dicarboxylic acids wherein any unsaturation present is olefinic and wherein any functional substituents present other than the acid halide or anhydride is halogen; in the liquid phase, in the presence of a Lewis acid catalyst selected from the group consisting of aluminum chloride and titanium tetrachloride, at a temperature between approximately room temperature and the boiling point of said liquid phase, and recovering a 2-acetyl-1,3-diketone as the product.

2. A method according to claim 1 in which said carboxylic acid derivative is such derivative of an aliphatic monocarboxylic acid.

3. A method according to claim 1 wherein said carboxylic acid derivative is such derivative of an aliphatic cyclizable dicarboxylic acid having from 2 to 4 carbon atoms between the carboxyl groups.

4. A method according to claim 1 wherein said Lewis acid catalyst is aluminum chloride.

5. A method according to claim 1 wherein said Lewis acid catalyst is titanium tetrachloride.

6. A method according to claim 3 in which isopropenyl acetate is reacted with a succinic acid derivative selected from the group consisting of succinic acid anhydride and succinic acid halides.

7. A method according to claim 3 wherein isopropenyl acetate is reacted with maleic anhydride.

8. A method according to claim 3 wherein isopropenyl acetate is reacted with an alkyl substituted maleic anhydride.

9. A method according to claim 3 wherein isopropenyl acetate is reacted with a halogen substituted maleic anhydride.

10. A method according to claim 3 wherein isopropenyl acetate is reacted with adipyl halide.

11. A method according to claim 3 wherein isopropenyl acetate is reacted with polymeric anhydride of adipic acid.

12. A method according to claim 3 wherein isopropenyl acetate is reacted with glutaric anhydride.

13. A method according to claim 3 wherein isopropenyl acetate is reacted with phthalic anhydride.

14. A method according to claim 3 wherein isopropenyl acetate is reacted with a methyl substituted succinic anhydride.

15. A method according to claim 2 wherein isopropenyl acetate is reacted with acetic anhydride.

References Cited

Sieglitz et al. "Chem. Ber." vol. 84, pp. 607 to 610 (1951).

Young et al. "J. Am. Chem. Soc.," vol. 72, pp. 3635 to 3639 (1950).

LEON ZITVER, *Primary Examiner.*

M. JACOB, *Assistant Examiner.*

UNITED STATES PATENT OFFICE
CERTIFICATE OF CORRECTION

Patent No. 3,356,731                                December 5, 1967

John Martin Nilsson et al.

It is hereby certified that error appears in the above numbered patent requiring correction and that the said Letters Patent should read as corrected below.

Column 2, line 1, for "maeic" read -- maleic --; line 56, for "12" read -- 2 --; column 4, line 64, for "$C_7H_5Cl_5O_3$" read -- $C_7H_5ClO_3$ --; column 5, line 10, for "$C_9H_{19}O_3$" read -- $C_9H_{10}O_3$ --.

Signed and sealed this 6th day of May 1969.

(SEAL)
Attest:

Edward M. Fletcher, Jr.
Attesting Officer

Commissioner of Patents